United States Patent
Onda et al.

(10) Patent No.: US 8,229,526 B2
(45) Date of Patent: Jul. 24, 2012

(54) PORTABLE DEVICE WITH SLIDING HOUSING

(75) Inventors: Nobuhiko Onda, Kawasaki (JP); Tomoyuki Nagamine, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 96 days.

(21) Appl. No.: 12/721,106

(22) Filed: Mar. 10, 2010

(65) Prior Publication Data

US 2010/0248797 A1   Sep. 30, 2010

(30) Foreign Application Priority Data

Mar. 30, 2009   (JP) .................... 2009-080779

(51) Int. Cl.
*H04M 1/00*   (2006.01)

(52) U.S. Cl. ........... 455/575.4; 455/575.1; 455/556.2; 455/90.3; 267/167; 361/679.01; 379/433.01

(58) Field of Classification Search ........... 455/575.4, 455/575.1, 550.1, 556.2, 566, 90.3, 418; 267/167; 361/679.01; 379/433.01
See application file for complete search history.

(56) References Cited

U.S. PATENT DOCUMENTS

2008/0099969 A1* 5/2008 Kim et al. ............. 267/167
2008/0146297 A1   6/2008 Ho
2008/0153558 A1* 6/2008 Mifune et al. ......... 455/575.4
2009/0027836 A1* 1/2009 Wakihara ............... 361/679

FOREIGN PATENT DOCUMENTS

| JP | 2006-270804 A | 10/2006 |
| JP | 2008-154197 A | 7/2008 |
| JP | 2008-160261 A | 7/2008 |

* cited by examiner

*Primary Examiner* — Shaima Q Aminzay
(74) *Attorney, Agent, or Firm* — Westerman, Hattori, Daniels & Adrian, LLP (57) ABSTRACT

A portable device includes: a first housing; a second housing slidably coupled to the first housing, the second housing being slidable from one end of the predetermined slidable range to the other end thereof via the middle position thereof; a first and second spring members; a first and second arms; a connecting arm connecting the first spring member with the second spring member; wherein when the second housing is slid from the one end to the middle position, the first and second spring members generate a reaction force while the second spring member stays in the initial position, and when the second housing is slid from the middle position to the other end, the first and second spring members move along the sliding of the second housing.

7 Claims, 8 Drawing Sheets

PORTABLE DEVICE WITH SLIDING HOUSING

CROSS-REFERENCE TO RELATED APPLICATION

This application is based upon and claims the benefit of priority of the prior Japanese Patent Application No. 2009-080779, filed on Mar. 30, 2009, the entire contents of which are incorporated herein by reference.

FIELD

A certain aspect of the embodiments discussed herein relates to a portable device.

BACKGROUND

There is known a portable device including a first housing and a second housing which linearly slide. The first and second housings can stop only at both ends of a sliding range. Patent document 1 and 2 disclose related arts

[Patent document 1] Japanese Laid-open Patent Publication No. 2008-160261

[Patent document 2] Japanese Laid-open Patent Publication No. 2008-154197.

Such a portable device has two usage modes, i.e., a first mode in which the portable device is stopping at one end of the sliding range and a second mode in which the portable device is stopping at the other end thereof. The present inventors have found that such a sliding portable device having two usage modes may be awkward to use depending on a usage pattern and have also found that, in particular, as the sliding range is larger, the possibility of occurrence of such a situation becomes higher.

SUMMARY

According to an aspect of an embodiment, a portable device includes: a first housing; a second housing slidably coupled to the first housing in a predetermined sliding range, the second housing being slidable from one end of the predetermined slidable range to the other end thereof via the middle position thereof; a first spring member; a second spring member; a first arm connected to the first spring member and engaged with the first housing; a second arm connected to the second spring member and engaged with the second housing; a connecting arm connecting the first spring member with the second spring member; the first, the second and the connecting arms extending generally in the same plane, the first and the second arms being disposed to form acute angles with the connecting arm around the first and the second spring members, respectively; the first and second spring members being capable of generating reaction forces when the first and second arms are forcibly driven to reduce the angles; wherein when the second housing is slid from the one end to the middle position of the sliding range, the first and second spring members generate a reaction force by reduction of the angles while the second spring member stays in the initial position, and when the second housing is slid from the middle position to the other end of the sliding range, the first and second spring members move along the sliding of the second housing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will be described below. A portable device is, for example, a mobile phone.

First Embodiment

Figure 1A:
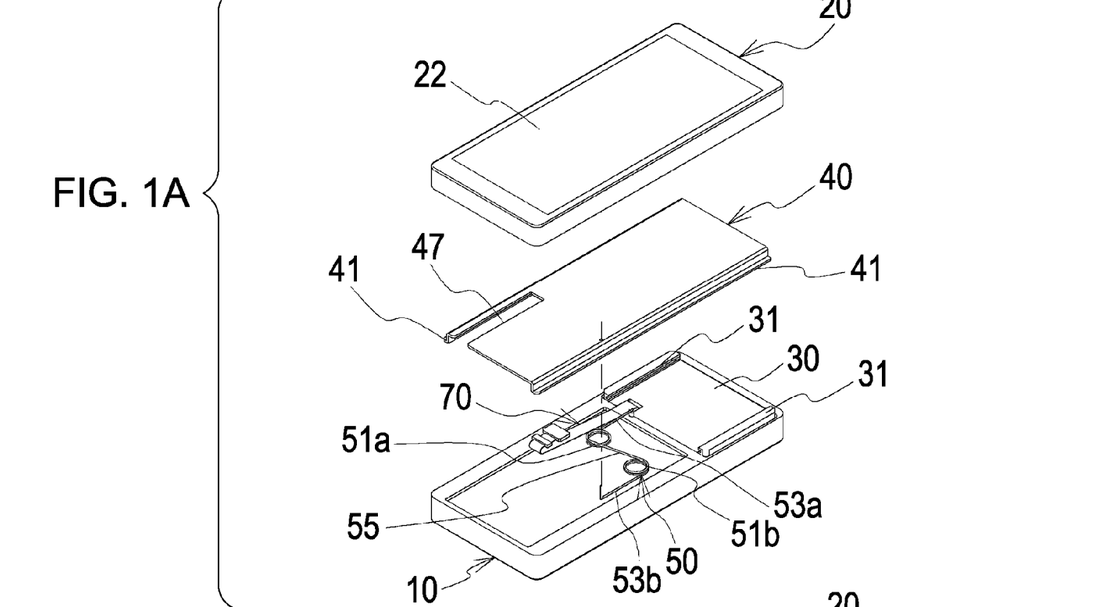
FIGS. 1A and 1B are exploded perspective views of a mobile phone according to a first embodiment of the present invention.
Figure 1B:
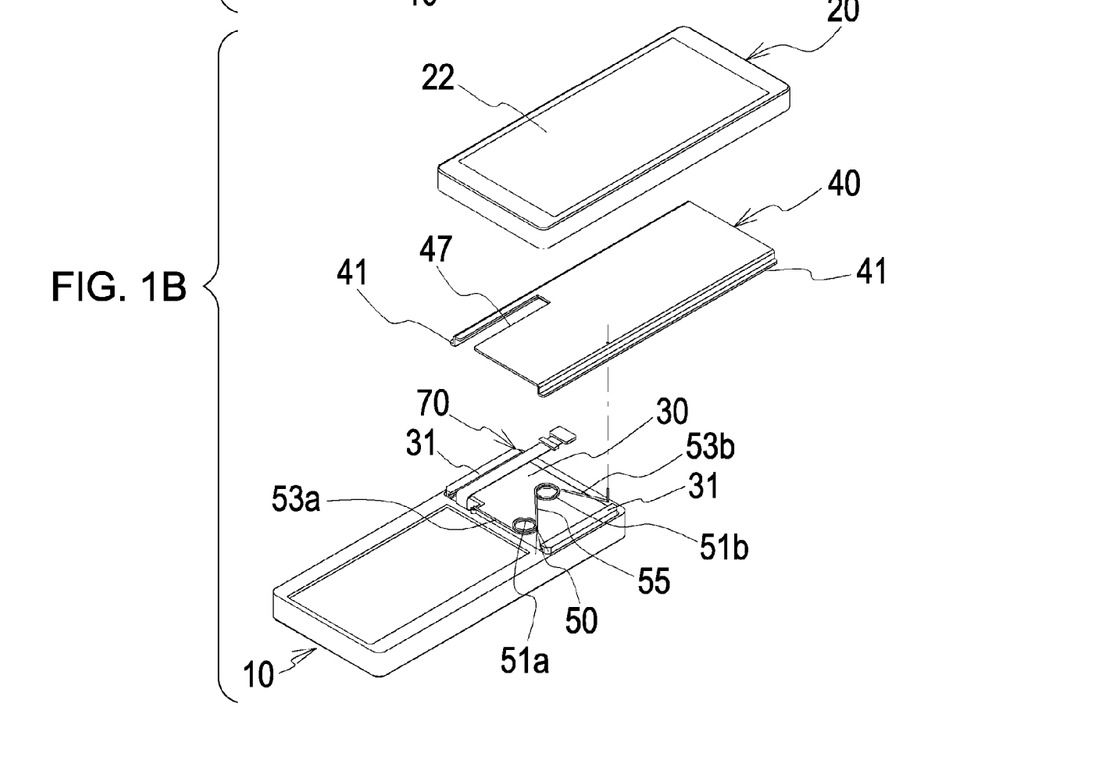
Figure 2A:
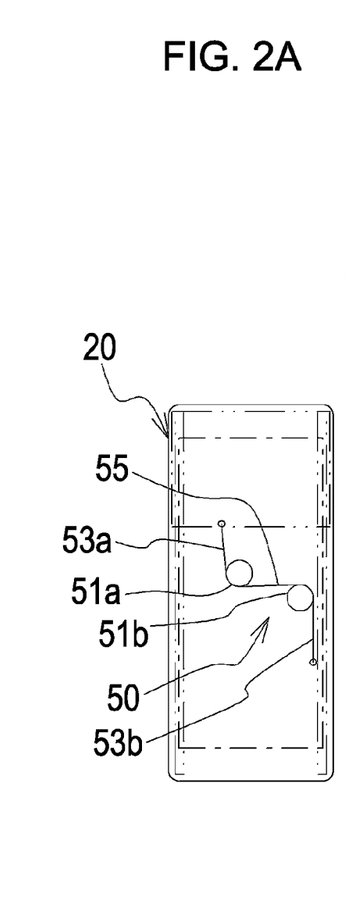
FIGS. 2A to 2E are diagrams explaining sliding of the mobile phone according to the first embodiment.
Figure 2B:
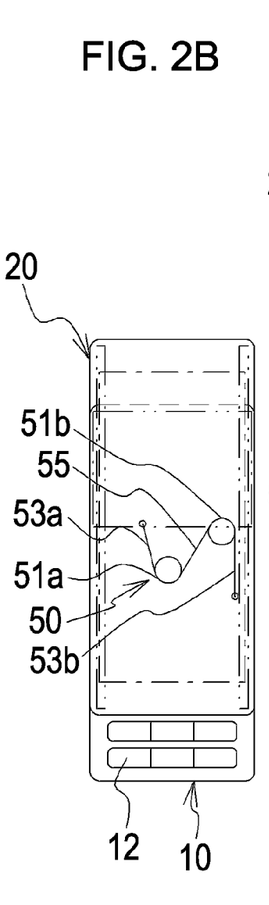
Figure 2C:
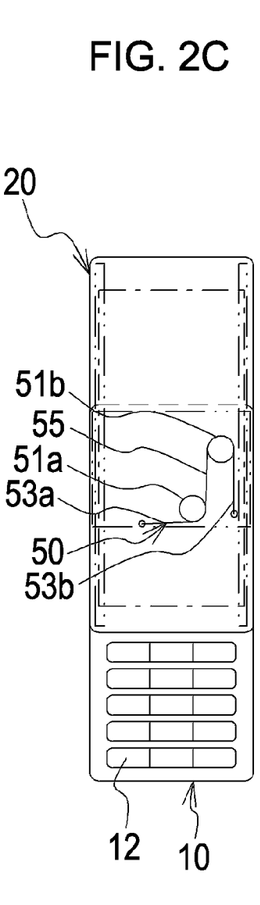

FIGS. 1A and 1B are exploded perspective views of a mobile phone according to a first embodiment of the present invention. FIGS. 2A to 2E are diagrams explaining sliding of the mobile phone according to the first embodiment. FIG. 1A illustrates the mobile phone in a fully closed mode which will be described below. FIG. 1B illustrates the mobile phone in a fully open mode. FIGS. 2A to 2E illustrate the transition of the mobile phone from the fully closed mode to a partially open mode and the transition thereof from the partially open mode to the fully open mode. FIG. 2A illustrates the mobile phone in the fully closed mode. FIG. 2C illustrates the mobile phone in the partially open mode. FIG. 2E illustrates the mobile phone in the fully open mode.

Referring to FIGS. 1A and 1B, the mobile phone includes a main body section (first housing) 10 and a display section (second housing) 20 which are slidably coupled to each other. The display section 20 includes in the front thereof a display 22 which is exposed at all times. Referring to FIG. 2E, the main body section 10 is provided with a ten-key pad 12 and a function key 14 which are exposed in the fully open mode. In the partially open mode shown in FIG. 2C, only the ten-key pad 12 is exposed. The ten-key pad 12 corresponds to a first operation member and the function key 14 corresponds to a second operation member.

Referring to FIGS. 1A and 1B, a base plate 30, a slider 40, and an urging member 50 are arranged between the main body section 10 and the display section 20. The base plate 30 is fixed to the front surface of the main body section 10 facing the display section 20. The slider 40 is fixed to the rear surface of the display section 20 facing the main body section 10. Guides 31 are disposed on both sides of the base plate 30. Rails 41 are arranged on both sides of the slider 40. The guides 31 and the rails 41 are slidably engaged with each other, respectively. Thus, the main body section 10 is coupled to the display section 20 such that they are linearly slidable within a predetermined sliding range. Both ends of the sliding range correspond to the fully open mode and the fully closed mode, respectively. The middle position of the sliding range corresponds to the partially open mode. The fully open mode and the fully closed mode are limited by stoppers (not shown) provided for the main body section 10 and the display section 20, respectively.

The main body section 10 is electrically connected to the display section 20 by a flexible printed circuit board 70. The slider 40 has a notch 47 for receiving the flexible printed circuit board 70.

The urging member 50 is disposed between the main body section 10 and the slider 40. One end of the urging member 50 is coupled to the main body section 10 and the other end thereof is coupled to the slider 40. In other words, the other end of the urging member 50 is coupled to the display section 20 side. The urging member 50 assists the sliding of the main body section 10 and the display section 20. More specifically, the urging member 50 assists the transition between the fully closed mode and the partially open mode and that between the partially open mode and the fully open mode.

The structure of the urging member 50 will now be described in brief.

Referring to FIG. 1A, the urging member 50 includes coils $51a$ and $51b$, arms $53a$ and $53b$, and a connecting part 55. One end of the arm $53a$ is coupled to the main body section 10 and is engaged with the main body section 10. One end of the arm $53b$ is coupled to the display section 20 is engaged with the display section 20. The urging member 50 has a shape in which two resilient elements are connected in series. The coils $51a$ and $51b$ have substantially the same shape. The length of the arm $53a$ is shorter than that of the arm $53b$. The arms $53a$ and $53b$ extend from the connecting part 55 in different directions. The connecting part 55 connects the coils $51a$ and $51b$. The coils $51a$ and $51b$ are provided for the connecting part 55 in different positions. The arms $53a$, $53b$ and the connecting part 55 extend generally in the same plane. The arms $53a$ and $53b$ are disposed to form acute angles with the connecting part 55 around the coils $51a$ and $51b$, respectively. The coils $51a$ and $51b$ are capable of generating reaction forces when the first and second arms are forcibly driven to reduce the angles.

FIGS. 1A and 2A illustrate the fully closed mode in which the main body section 10 is covered by the display section 20. When the display section 20 is pressed upward relative to the main body section 10 in the fully closed mode, the display section 20 is slid above the main body section 10, so that the ten-key pad 12 obscured by the display section 20 is starting to be exposed, as shown in FIG. 2B. When the display section 20 is further pressed upward relative to the main body section 10, the ten-key pad 12 is completely exposed, so that the mode shifts to the partially open mode, as shown in FIG. 2C. In the partially open mode, the display section 20 is stopped by an urging force of the urging member 50. In other words, the display section 20 is slidably coupled to the main body section 10 in a predetermined sliding range. The second housing is slidable from one end of the predetermined slidable range to the other end thereof via the middle position thereof. This will be described in detail later.

Figure 2D:
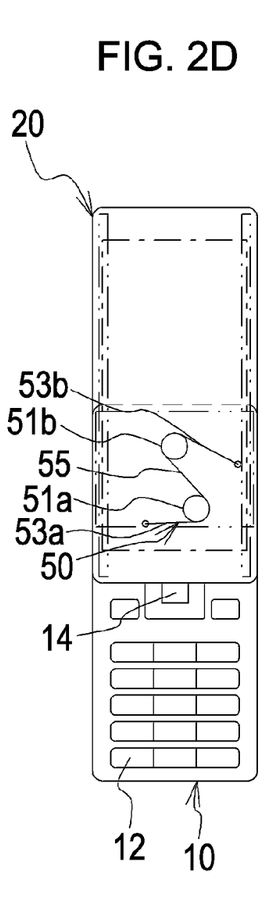
Figure 2E:
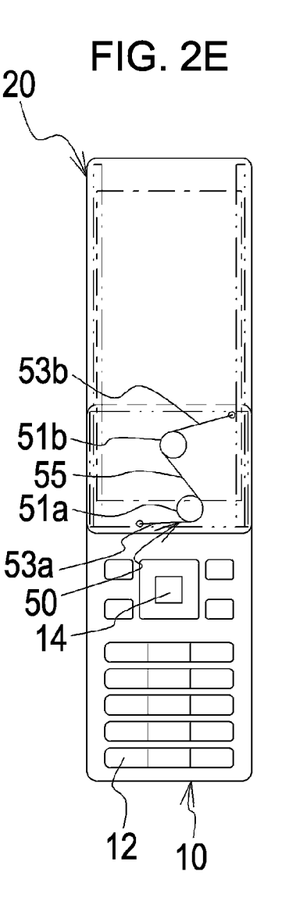

When the display section 20 is pressed upward relative to the main body section 10 in the partially open mode, the function key 14 obscured by the display section 20 is starting to be exposed, as shown in FIG. 2D. When the display section 20 is further pressed upward relative to the main body section 10, the function key 14 is completely exposed, so that the mode shifts to the fully open mode, as shown in FIG. 2E. The urging member 50 is obscured by the main body section 10 and the display section 20 at all times, irrespective of the position of the display section 20 to be slid.

Deformation of the urging member 50 accompanying the mode transition will now be described.

In the fully closed mode, as shown in FIG. 2A, the arms $53a$ and $53b$ extend in the sliding direction in which the display section 20 is slid and the connecting part 55 extends in the direction substantially orthogonal to the sliding direction. In this state, the urging member 50 produces a resilient restoring force that causes the arm $53a$ and the connecting part 55 to move further away from each other, with the coil $51a$ as a center and also causes the arm $53b$ and the connecting part 55 to move further away from each other, with the coil $51b$ as a center. Thus, the urging member 50 maintains the display section 20 to be in the fully closed mode.

When the display section 20 is slightly slid from the fully closed mode, the coils $51a$ and $51b$ are shifted downward and upward, respectively, as shown in FIG. 2B. In this state, the arm $53a$ and the connecting part 55 tend to move away from each other. Similarly, the arm $53b$ and the connecting part 55 tend to move away from each other. Accordingly, in the state shown in FIG. 2B, the urging member 50 applies an urging force for returning to the fully closed mode to the display section 20.

When the display section 20 is further slid, the display section 20 is shifted to the partially open mode. Referring to FIG. 2C, the arm $53a$ and the connecting part 55 further move away from each other. The arm $53b$ and the connecting part 55 move close to each other such that they extend in substantially parallel to each other. The arm $53a$ extends in the direction orthogonal to the sliding direction. The arm $53b$ and the connecting part 55 extend in the sliding direction. The angle formed by the arm $53b$ with the connecting part 55 is smaller than that formed by the arm $53a$ with the connecting part 55. Accordingly, in the partially open mode, the restoring force causes the arm $53b$ and the connecting part 55 to move away from each other. In the partially open mode, therefore, the component in the sliding direction of the urging force of the urging member 50 decreases. Thus, the sliding stops in the partially open mode.

When the display section 20 is further slid from the partially open mode, the arm $53a$ and the connecting part 55 move close to each other, as shown in FIG. 2D and the arm $53b$ and the connecting part 55 start to move away from each other. Thus, the component in the sliding direction of the urging force of the urging member 50 starts to gradually increase.

When the display section 20 is further slid, the urging force of the urging member 50 causes the display section 20 to be shifted to the fully open mode shown in FIG. 2E. In the fully open mode, the arm $53a$ and the connecting part 55 tend to move away from each other and the arm $53b$ and the connecting part 55 also tend to move away from each other. As described above, the urging member 50 maintains the mobile phone in the fully open mode. In other words, when the display section 20 is slid from the one end to the middle position of the sliding range, the coils $51a$ and $51b$ generate a reaction force by reduction of the angles while the coil $51b$ stays in the initial position, and when the display section 20 is slid from the middle position to the other end of the sliding range, the coils $51a$ and $51b$ move along the sliding of t the display section 20. The transition from the fully open mode to the partially open mode and that from the partially open mode to the fully closed mode are the reverse of the above-described transitions.

As described above, the display section 20 can be stopped at any of one end of the sliding range, the other end thereof, and the middle position thereof. Accordingly, the mobile phone according to the present embodiment has three usage modes, i.e., the fully closed mode, the partially open mode, and the fully open mode. A user can select a desired mode from among the three usage modes according to a usage pattern.

For example, in a mobile phone having only two usage modes of the fully closed mode and the fully open mode, the mobile phone may be awkward to use according to a user's usage pattern. For instance, when the user uses the mobile phone only for conversation, the length of the mobile phone used in the fully open mode may be too long. In addition, when the user operates only the ten-key pad 12 without using the function key 14, a similar problem may occur. In particular, when the sliding range is large, such a problem may occur. When any operation member is not provided for the display section 20 so that the display section 20 includes a large display 22, it is necessary to arrange all of operation members in the main body section 10. When all of the operation members are arranged in the main body section 10, the sliding range has to be set large so that all of the operation members are exposed. The present inventors have found that the above-described problems may occur in such a case.

In the mobile phone according to the first embodiment, when only the ten-key pad 12 is operated or when the mobile phone in the fully open mode is awkward to use, the mobile phone can be shifted to the partially open mode. As described above, the ease of use of the mobile phone according to the first embodiment is increased.

The structure of the urging member 50 will now be described in detail.

The spring constant of the element including the coil 51a and the arm 53a and that of the element including the coil 51b and the arm 53b can be obtained by the following equation.

$$K = \frac{E \cdot \pi \cdot d^4}{64 \cdot \{\pi \cdot \Phi \cdot n + (a+b)/3\}} \quad (1)$$

E denotes the modulus of longitudinal elasticity, d denotes the diameter of wire, Φ denotes the outer diameter of a coil, n indicates the number of turns of the coil, and a and b each denote the length of an arm. For example, the spring constant of the element including the coil 51a and the arm 53a can be calculated by substituting the length of the arm 53a into the above-described value a and substituting the length of the connecting part 55 into the above-described value b.

As shown in FIGS. 2A to 2C, in the transition from the fully closed mode to the partially open mode, the coil 51b and the arm 53b deform earlier than the coil 51a and the arm 53a. Accordingly, the spring constant Ka of the element including the coil 51a and the arm 53a is set larger than the spring constant Kb of the element including the coil 51b and the arm 53b. The larger the spring constant, the higher the resistance to deformation. In the mobile phone according to the first embodiment, the length of the arm 53a is set shorter than that of the arm 53b. Thus, the spring constant Ka is set larger than the spring constant Kb such that the urging member 50 deforms as shown in FIG. 2C. To change the spring constant, the outer diameter of the coil may be changed or the number of turns of the coil may be changed. Alternatively, both of the outer diameter and the number of turns of the coil may be changed.

The urging force of the urging member 50 will now be described in detail.

Figure 3:
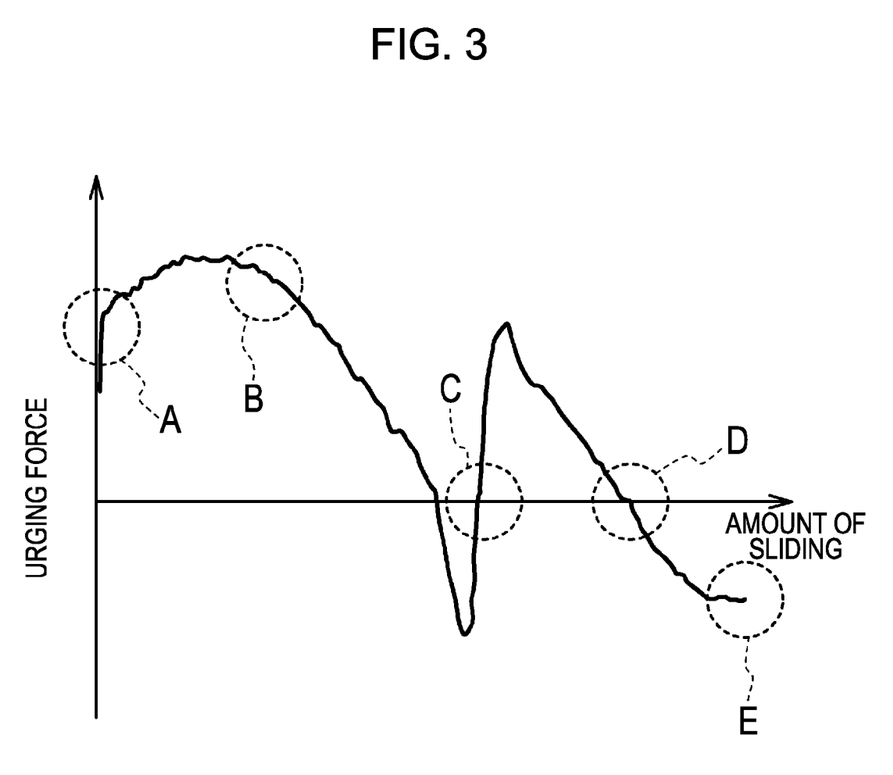
FIG. 3 is a graph illustrating an urging force of an urging member.
Figure 4A:
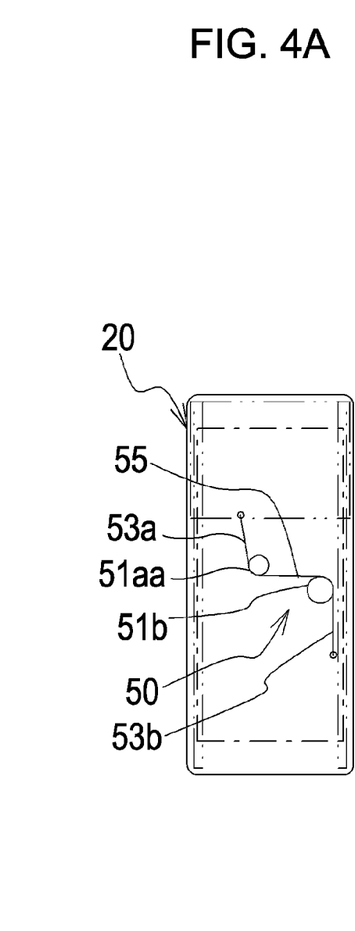
FIGS. 4A to 4E are diagrams explaining sliding of a mobile phone according to a second embodiment of the present invention.
Figure 4B:
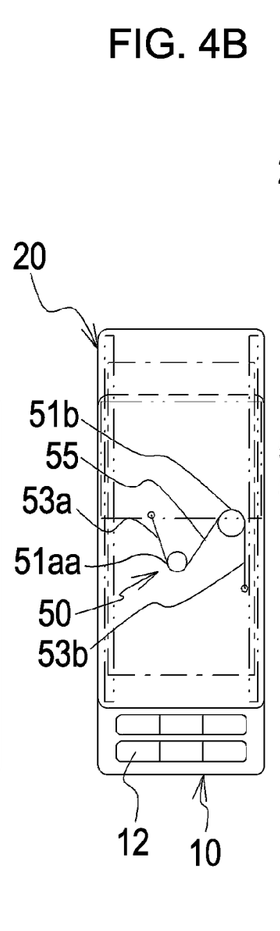
Figure 4C:
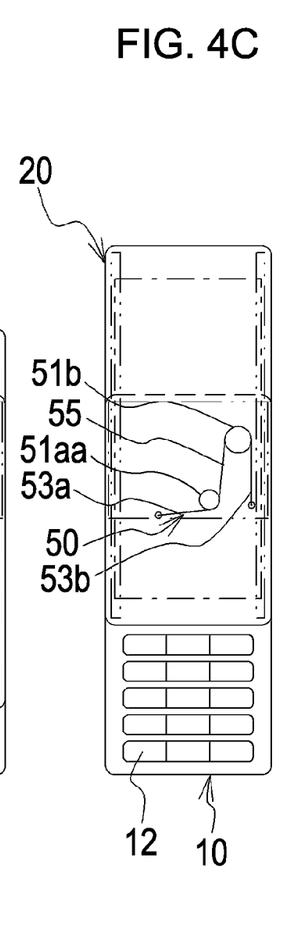
Figure 4D:
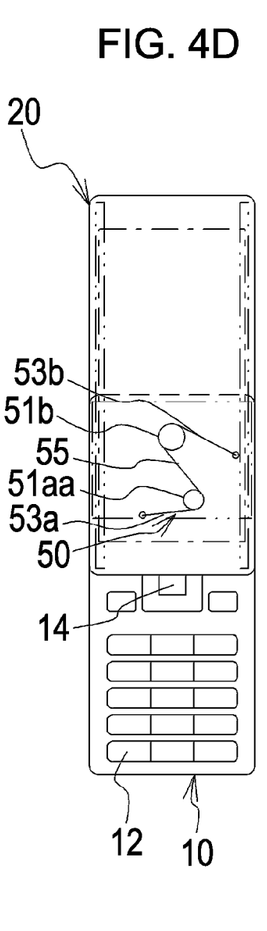
Figure 4E:
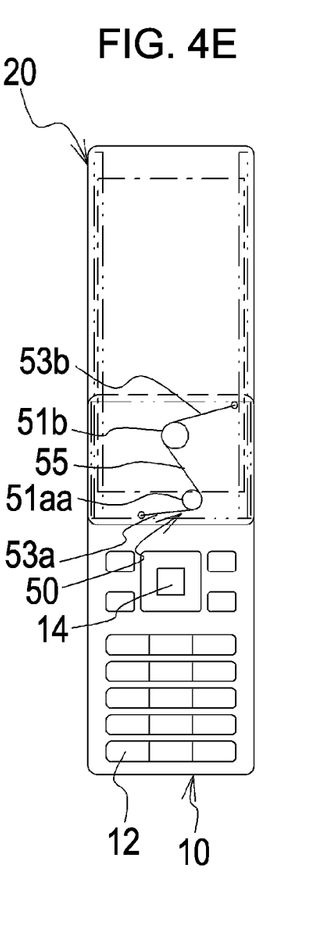

FIG. 3 is a graph showing the urging force of the urging member 50. The graph of FIG. 3 shows the urging force of the urging member 50 plotted against the amount of sliding. More specifically, in the axis of ordinates, the urging force acting to maintain the mobile phone in the fully closed mode is indicated by a positive value and that acting to maintain the mobile phone in the fully open mode is indicated by a negative value. Positions A to E, indicated by dashed lines, in FIG. 3 correspond to the states in FIGS. 2A to 2E, respectively.

When the display section 20 is slid from the position A (the fully closed mode) to the position B against the urging force of the urging member 50, the difference between the above-described spring constants causes the arm 53b and the connecting part 55 to move close to each other earlier than the arm 53a and the connecting part 55. When the display section 20 is further slid from the position B, the urging force varies from a positive value to a negative value. The display section 20 is slid to the position C (the partially open mode) in accordance with the urging force of the urging member 50.

In the position C, the angle which the arm 53b forms with the connecting part 55 is minimized and the angle which the arm 53a forms with the connecting part 55 is maximized. In addition, the component in the sliding direction of the urging force is substantially zero.

When the display section 20 is further slid from the position C, the urging force varies from a positive value to a negative value in the position D. When the display section 20 is slid beyond the position D, the urging force assists the display section 20 in shifting to the position E (the fully open mode), so that the display section 20 is shifted to the fully open mode. The urging force of the urging member 50 maintains the display section 20 in the fully open mode.

As described above, the mobile phone according to the first embodiment can be kept in the partially open mode. For example, a typical sliding mobile phone having only two usage modes of the fully open and fully closed modes is not intended to stop while being partially opened. In other words, typical mobile phones are designed so as not to stop while being partially opened. Accordingly, maintaining such a typical mobile phone while being partially opened requires a mechanism for maintaining the mobile phone to be partially opened against the urging force of the urging member. It is difficult to provide such a mechanism for a small device like a mobile phone. Since the mobile phone according to the first embodiment includes the urging member 50, the display section 20 can be stopped at any of one end of the sliding range, the other end thereof, and the middle position thereof with the above-described simple structure.

Second Embodiment

A mobile phone according to a second embodiment of the present invention will be described below. FIGS. 4A to 4E are diagrams explaining sliding of the mobile phone according to the second embodiment.

Referring to FIGS. 4A to 4E, the outer diameter of a coil 51aa is smaller than that of the coil 51a of the urging member 50 in the first embodiment. Such a reduction in outer dimension can control the spring constant of the coil 51aa. Thus, a position where the display section 20 stops on the way in the sliding range can be finely adjusted and an urging force can also be controlled.

Third Embodiment

Figure 5A:
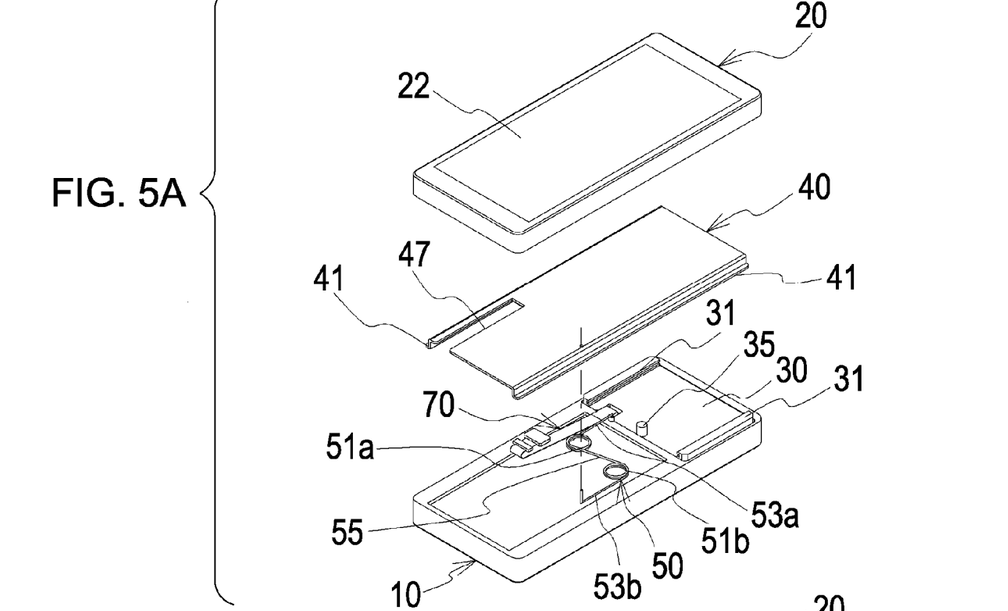
FIGS. 5A and 5B are exploded perspective views of a mobile phone according to a third embodiment of the present invention.
Figure 5B:
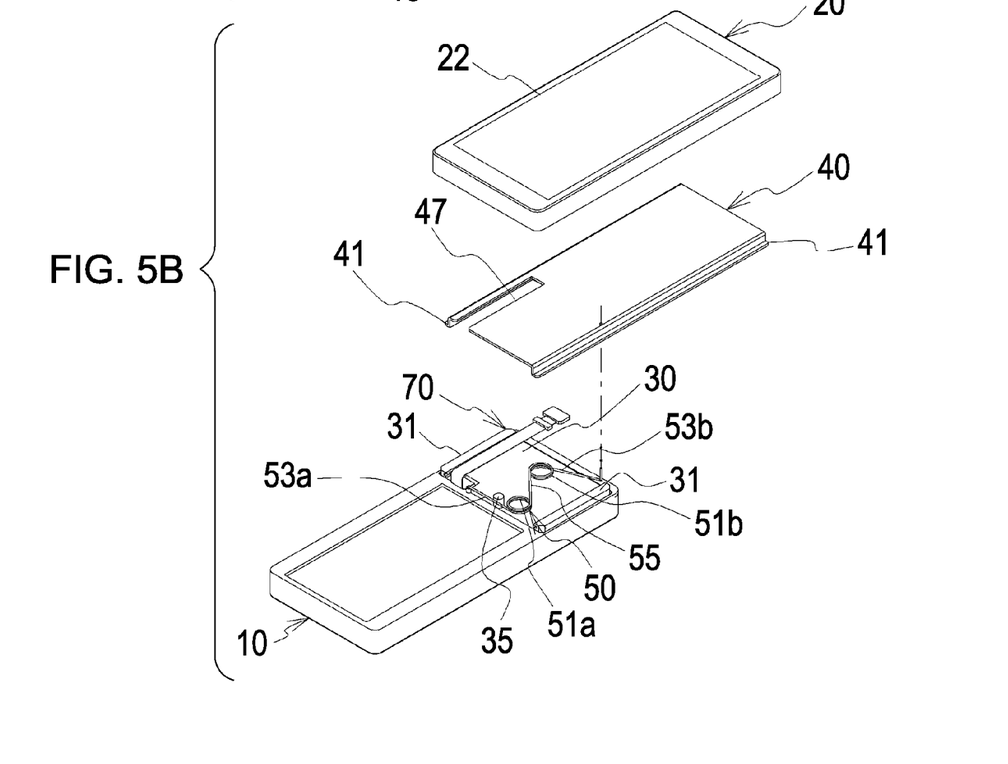

A mobile phone according to a third embodiment of the present invention will be described below. FIGS. 5A and 5B are exploded perspective views of the mobile phone according to the third embodiment. FIGS. 6A to 6E are diagrams explaining sliding of the mobile phone according to the third embodiment.

The base plate 30 has a restricting protrusion 35. The restricting protrusion 35 has a function of defining a position where the display section 20 stops on the way in the sliding range by coming into contact with the urging member 50. The restricting protrusion 35 will be described in more detail below.

Figure 6A:
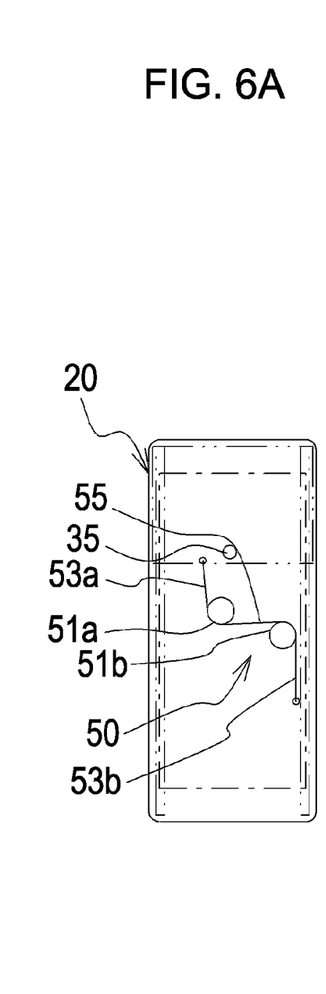
FIGS. 6A to 6E are diagrams explaining sliding of the mobile phone according to the third embodiment.
Figure 6B:
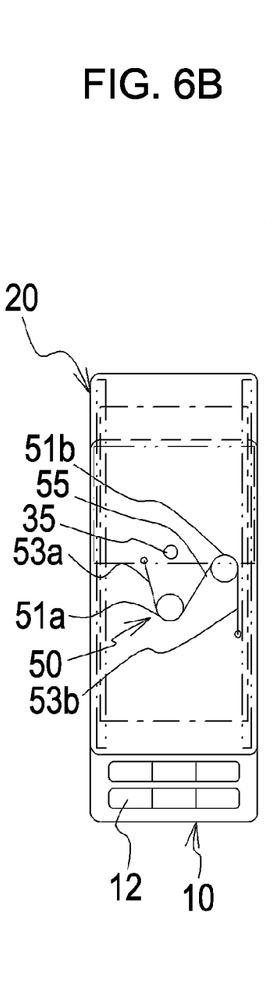
Figure 6C:
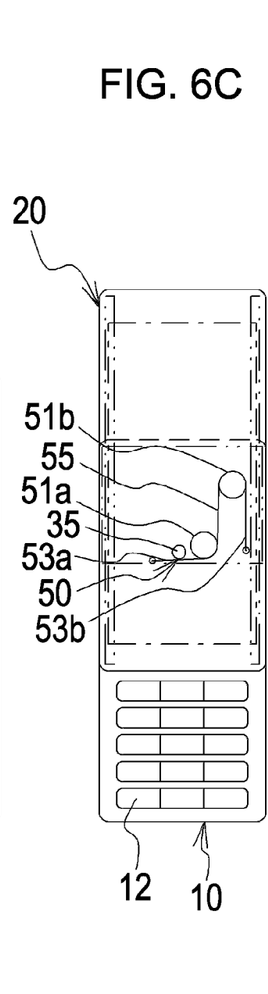
Figure 6D:
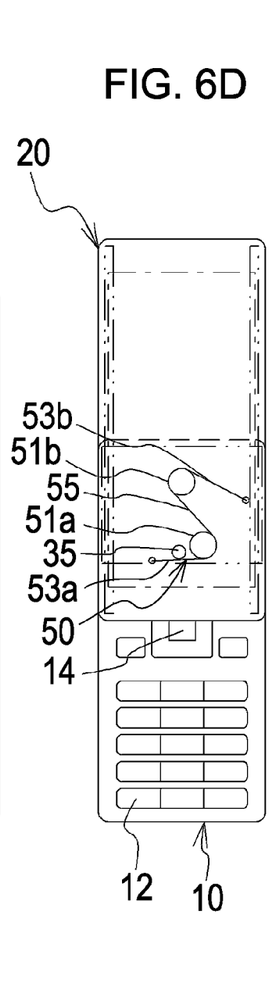
Figure 6E:
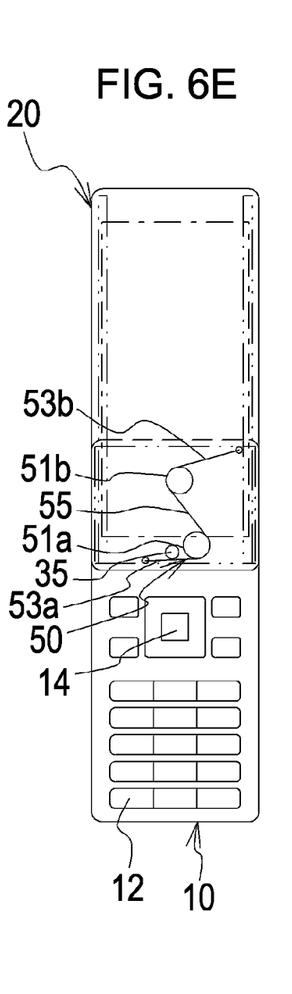

The spring constant Ka of the coil 51a is set larger than the spring constant Kb of the coil 51b. Accordingly, the arm 53a may be shifted upward in the partially open mode. If the arm 53a is deviated from its original position as described above, the stop position of the display section 20 in the partially open mode may be shifted. For example, the stop position in the partially open mode may vary each time the display section 20 is slid. The restricting protrusion 35 comes into contact with the arm 53a to define the posture of the urging member 50 in the middle position of the sliding range. Thus, the middle position is defined.

Fourth Embodiment

Figure 7A:
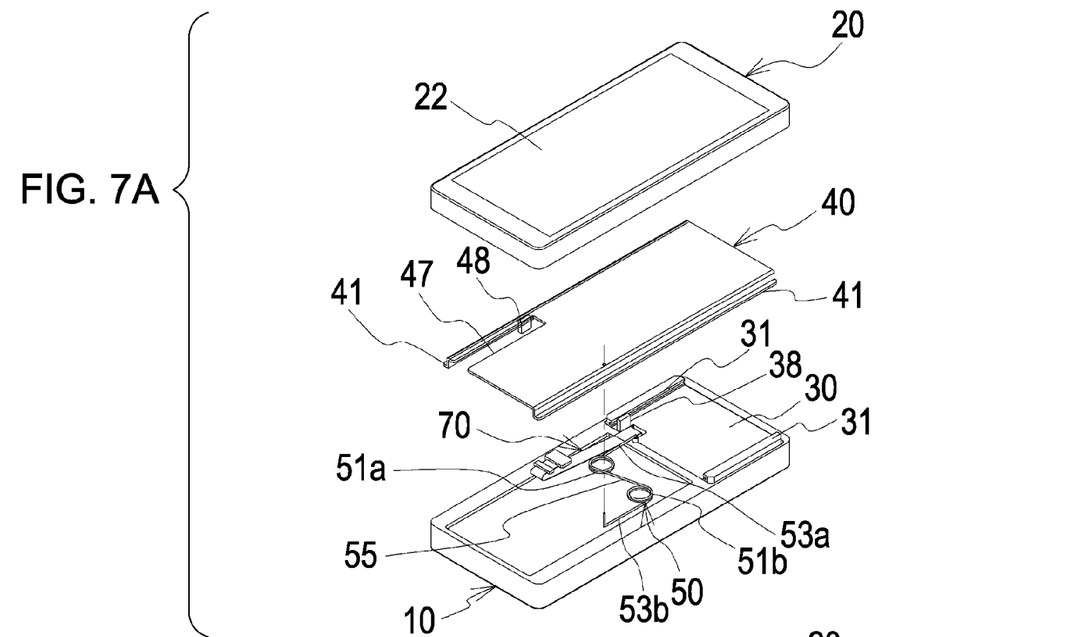
FIGS. 7A and 7B are exploded perspective views of a mobile phone according to a fourth embodiment of the present invention.
Figure 7B:
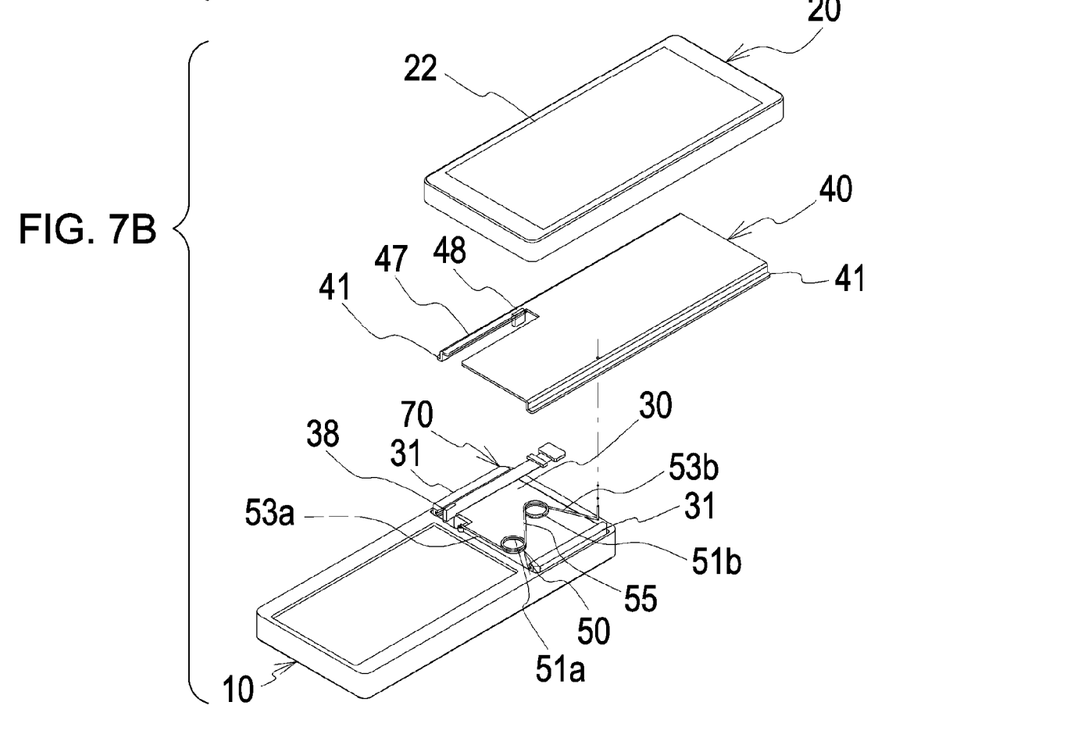

A mobile phone according to a fourth embodiment of the present invention will be described below. FIGS. 7A and 7B are exploded perspective views of the mobile phone according to the fourth embodiment. FIGS. 8A to 8E are diagrams explaining sliding of the mobile phone according to the fourth embodiment.

Figure 8A:
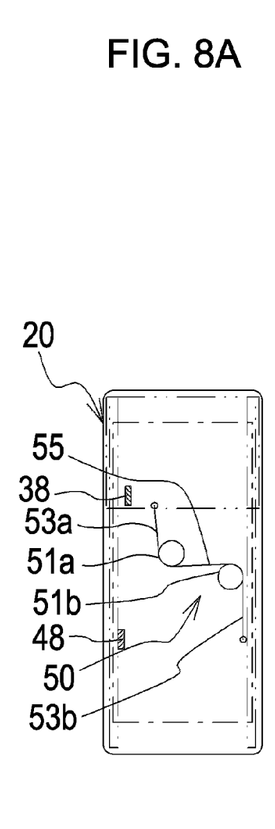
FIGS. 8A to 8E are diagrams explaining sliding of the mobile phone according to the fourth embodiment.
Figure 8B:
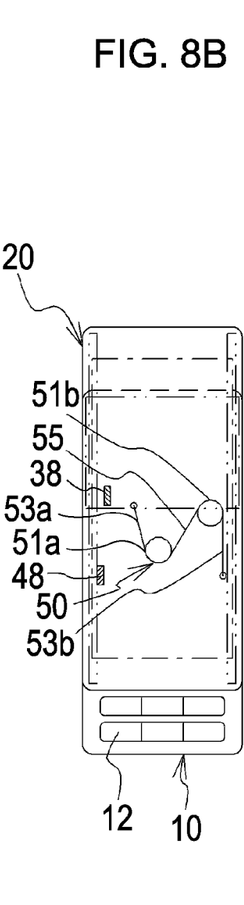
Figure 8C:
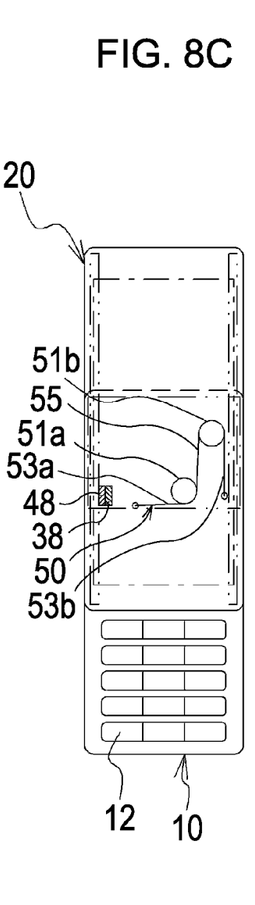
Figure 8D:
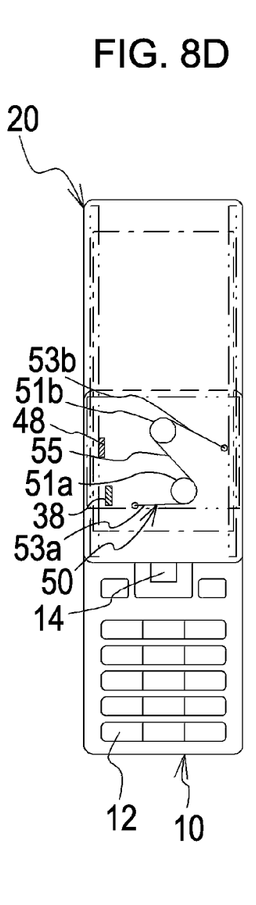
Figure 8E:
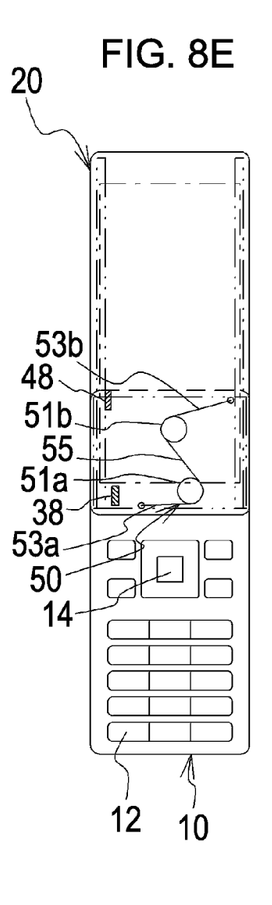

Referring to FIGS. 7A and 7B, a magnet 48 is provided for the slider 40 so as to face the main body section 10. In addition, a magnet 38 is provided for the base plate 30. The magnets 38 and 48 each have a function of maintaining the display section 20 in the partially open mode. Referring to FIG. 8C, the magnet 38 faces the magnet 48 such that different poles attract each other in the partially open mode. Consequently, the magnetic attraction force between the magnets 38 and 48 can maintain the mobile phone in the partially open mode.

While the present invention has been described in detail in terms of its preferred embodiments, the present invention is not limited to a specific embodiment and various modifications and changes can be made without departing from the spirit and scope of the present invention as defined in the appended claims.

A portable device is not limited to a mobile phone. The present invention is applicable to a device including two housings which are linearly slidably coupled to each other, for example, a personal digital assistant (PDA) or a notebook computer. In the above-described mobile phone, when the main body section 10 is completely covered by the display section 20 such that the ten-key pad 12 and the function key 14 are obscured, the mobile phone is in the fully closed mode. The present invention is not limited to such a mobile phone. In other words, the present invention is applicable to a mobile phone in which operation keys provided for a main body section are exposed at all times.

All examples and conditional language recited herein are intended for pedagogical purposes to aid the reader in understanding the invention and the concepts contributed by the inventor to furthering the art, and are to be construed as being without limitation to such specifically recited examples and condition, nor does the organization of such examples in the specification relate to a showing of superiority and inferiority of the invention. Although the embodiment of the present inventions have been described in detail, it should be understood that the various changes, substitutions, and alternations could be made hereto without departing from the spirit and scope of the invention.

What is claimed is:

1. A portable device comprising:
 a first housing;
 a second housing slidably coupled to the first housing in a predetermined sliding range, the second housing being slidable from one end of the predetermined slidable range to the other end thereof via the middle position thereof;
 a first coil;
 a second coil;
 a first arm connected to the first coil and engaged with the first housing;
 a second arm connected to the second coil and engaged with the second housing; and
 a connecting arm connecting the first coil with the second coil,
 wherein the first, the second and the connecting arms extend generally in the same plane, the first and the second arms being disposed to form acute angles with the connecting arm around the first and the second coils, respectively,
 wherein the first and second coils are capable of generating reaction forces when the first and second arms are forcibly driven to reduce the angles, and
 wherein when the second housing is slid from the one end to the middle position of the sliding range, the first and second coils generate the reaction forces by reduction of the angles while the second coil stays in the initial position, and when the second housing is slid from the middle position to the other end of the sliding range, the first and second coils move along the sliding of the second housing.

2. The portable device according to claim 1, wherein at least one of diameters of the first and second coils, the number of turns of the first and second coils, outer diameters of the first and second coils, and lengths of the first and second arms is different.

3. The portable device according to claim 1, wherein the first arm extends in the direction orthogonal to the sliding direction, and the second and the connecting arm extends in the sliding direction at the middle position of the sliding range.

4. The portable device according to claim 1, wherein a first angle between the first arm and the connecting arm, and a second angle between the second arm and the connecting arm is different.

5. The portable device according to claim 1, wherein the first and second coils, the first and second arms, and the connecting arm form an urging member and the portable device further comprising:
 a restricting protrusion mounted on at least one of the first housing and the second housing and defining the middle position by coming into contact with the urging member.

6. The portable device according to claim 1, further comprising:
 a first magnet provided for the first housing; and
 a second magnet provided for the second housing and facing the first magnet at the middle position of the sliding range.

7. The portable device according to claim 1, further comprising:
 a first and second operating members in the first housing or the second housing;
 wherein the first operating member is exposed when the first and second housings stay in the middle position of the sliding range, and the second operating member is exposed when the first and second housing stay in the other end of the sliding range.

* * * * *